UNITED STATES PATENT OFFICE.

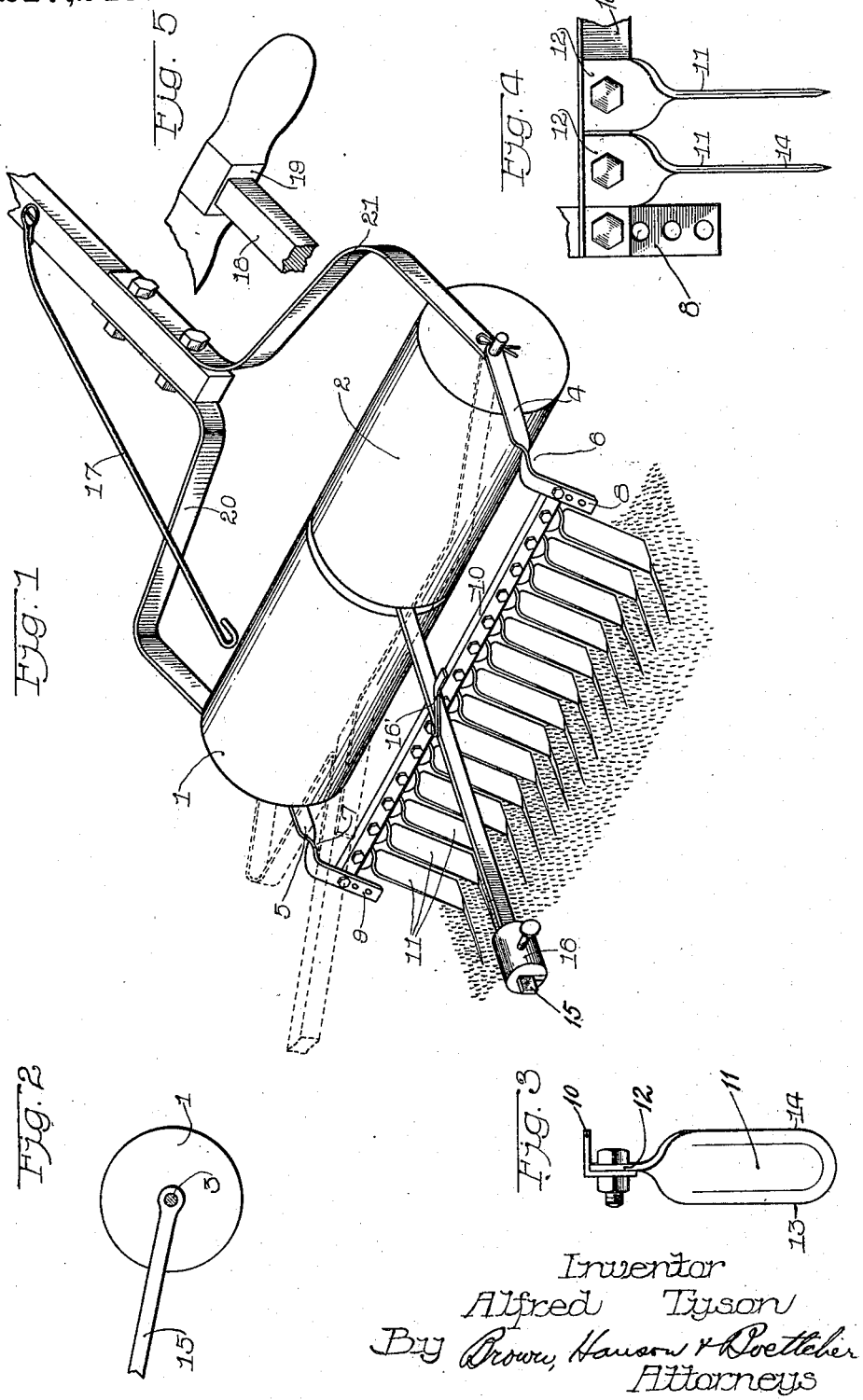

ALFRED TYSON, OF EVANSTON, ILLINOIS.

TURF-VENTILATOR.

1,217,245. Specification of Letters Patent. Patented Feb. 27, 1917.

Application filed May 1, 1916. Serial No. 94,522.

*To all whom it may concern:*

Be it known that I, ALFRED TYSON, a citizen of the United States, residing at Evanston, in the county of Cook and State of Illinois, have invented a certain new and useful Improvement in Turf-Ventilators, of which the following is a full, clear, concise, and exact description, reference being had to the accompanying drawings, forming a part of this specification.

My invention relates to a turf ventilator.

In caring for lawns, golf greens and the like, it is often desirable to break up the surface of the soil for the purpose of making the same more permeable to air and moisture. Inasmuch as the turf covers the ground indiscriminately, it is impossible to employ cultivating plows such as are employed in caring for gardens and the like as there are no definite rows and in fact no definite arrangement of the growth of the turf. However, it is obvious that loosening of the soil is just as desirable in growing turf or grass as it is in growing garden plants, corn or the like.

It is the object of my invention to provide a machine which can be employed to cultivate and ventilate the soil upon which turf or grass is growing for promoting the growth and to aid in seeding the turf.

I have illustrated one embodiment of my invention in the accompanying drawings in which—

Figure 1 is an isometric view of a turf ventilator constructed in accordance with my invention;

Fig. 2 is a detail view showing the manner of attaching the counterweight bar;

Fig. 3 is a detail view showing a ventilator tooth in side elevation;

Fig. 4 is a similar detail view showing a pair of teeth in front elevation; and

Fig. 5 is a fragmentary view of the handle which may be employed in connection with the machine shown in Fig. 1.

The turf ventilator which I have shown comprises the roller sections 1 and 2 which are preferably made of wood, although this is not of the essence of the invention. A longitudinal shaft 3 passes through the axes of the roller sections 1 and 2 and forms a support for them. A pair of brackets 4 and 5 are mounted on the shaft 3 and extend toward the rear of the device. These brackets 4 and 5 comprise flat pieces of metal which are twisted as shown at 6 and 7 to form the depending portions 8 and 9. A crossbar 10 which consists of a piece of angle iron has its ends bolted to the depending portions 8 and 9 and supports a plurality of knives 11 which operate upon the soil to be treated. One leg of the angle bar 10 is bolted flat against the depending parts 8 and 9 in a generally vertical position, the other leg of the angle extending in a generally horizontal position and forming a flat top surface covering the upper end of the teeth 11. The teeth 11 are formed of flat metal bars which have their upper ends 12 bolted flat against the lower leg of the angle bar, as shown in Fig. 3. The body of the tooth 11 is twisted at right angles to the attaching portion 12 so as to lie in a generally fore and aft direction. Both front and rear edges 13 and 14 are sharpened as shown in Fig. 3 so that the blades may be reversed. The depending parts 8 and 9 of the brackets 4 and 5 are provided with a series of holes for adjusting the position of these brackets with respect to the crossbar 10.

A bar 15 which is provided at its outer end with an adjustable counterweight 16 has its inner end pivoted on the shaft 3 as is shown in Fig. 2. The bar passes through an eye or loop 16′ which limits the lateral play of the bar 15 and which forms a convenient attaching means for the hook 17 when it is desired to raise the knives 11 out of contact with the ground when the machine is not in use.

A suitable rod or reach 18 is provided at its upper end with a suitable handle 19 preferably of the two hand type and is connected to the shaft 3 by means of the arms 20 and 21 which embrace the roller sections 1 and 2. The arms 20 and 21 are pivoted on the shaft 3 so that the handle may be moved into the dotted line position shown in Fig. 1 for pushing the machine forward.

The adjustable weight 16 may be adjusted to produce any desired depth of cut within the limits of the machine. The handle may be swung either to the front as shown in full lines in Fig. 1 or to the rear as shown in dotted lines, as desired. For shallow cutting the machine is pulled, but when it is desired to cut more deeply it may be pushed.

It is apparent that the device which I have described may be made in a variety of sizes with different proportions and dimensions from that illustrated in the accompanying drawings.

The knives 11 cut into the soil to increase the porosity thereof, promoting more luxuriant growth of the turf and making the turf and soil capable of retaining more moisture. It is apparent that less seeding will be required and that generally improved results may be obtained.

What I claim is:

1. In combination a cross-bar and a plurality of knives attached to said cross-bar, said knives comprising flat metal bars having their edges sharpened, each bar having a portion thereof twisted at right angles to another portion of said bar, said latter portion being axially in line with said first portion, a roller, a shaft for said roller, said knives being connected to swing about said shaft and a weight acting on said bar to force said knives into the soil.

2. In a machine of the class described, an angle bar, a plurality of knives attached to said angle bar, said knives comprising flat top portions and flat lower portions, said lower portions being twisted at right angles with respect to said top portions, the lower ends of said knives being rounded and being adapted to enter the ground, said flat top portion being axially in line with the flat lower portion.

3. In combination a roller, a shaft for said roller, bracket arms secured to said shaft, a crossbar secured to said bracket arms, a plurality of knives rigidly secured to said bracket arms, and a weighted bar acting on said cross-bar for holding said knives with their ends below the surface of the ground.

4. In combination, a roller, a crossbar connected with said roller, a plurality of knives rigidly attached to said crossbar, said knives having their edges presented in a fore and aft direction with respect to said crossbar, means for moving said roller, said means comprising a handle pivoted with respect to said crossbar, and means for holding said knives with their ends below the surface of the ground, said latter means being pivoted with respect to said handle.

In witness whereof, I hereunto subscribe my name this 24th day of April, A. D. 1916.

ALFRED TYSON.

Copies of this patent may be obtained for five cents each, by addressing the "Commissioner of Patents, Washington, D. C."